US006922186B2

(12) United States Patent
Whitcomb (10) Patent No.: US 6,922,186 B2
(45) Date of Patent: Jul. 26, 2005

(54) ERGONOMIC COMPUTER MOUSE (76) Inventor: Curtis Whitcomb, 10908 Oneida Dr., Boise, ID (US) 83709

( * ) Notice: Subject to any disclaimer, the term of this patent is extended or adjusted under 35 U.S.C. 154(b) by 239 days.

(21) Appl. No.: 10/101,535

(22) Filed: Mar. 15, 2002

(65) Prior Publication Data
US 2002/0154095 A1 Oct. 24, 2002

Related U.S. Application Data
(60) Provisional application No. 60/276,309, filed on Mar. 15, 2001.

(51) Int. Cl.$^7$ ............................................. G06K 11/18
(52) U.S. Cl. ....................................................... 345/163
(58) Field of Search ................................ 345/418, 163, 345/157

(56) References Cited

U.S. PATENT DOCUMENTS

| | | |
|---|---|---|
| 3,835,464 A | 9/1974 | Rider |
| 3,854,131 A | 12/1974 | Vanderheiden et al. |
| 4,540,176 A | 9/1985 | Baer |
| 4,738,417 A | 4/1988 | Wenger |

(Continued)

FOREIGN PATENT DOCUMENTS

| WO | WO 91/04526 | 4/1991 | ............. G06F/3/02 |
|---|---|---|---|
| WO | WO 99/57627 | 11/1999 | ............. G06F/1/16 |
| WO | WO 00/51069 | 8/2000 | ........... G06K/11/18 |

OTHER PUBLICATIONS

Printout of Website of "KidzMouse" printed Jun. 4, 2002.

Primary Examiner—Mark Zimmerman
Assistant Examiner—Cliff N. Vo
(74) Attorney, Agent, or Firm—Pedersen & Co., PLLC; Ken J. Pedersen; Barbara S. Pedersen (57) ABSTRACT This invention is a pointing device, i.e. a computer mouse, for producing computer program commands issued by young children or others that have difficulty operating a conventional mouse device. A rotatable ball or other pointing mechanism is provided in the housing. A horizontally-elongated button is located within the front surface of the housing. This button, having a horizontal arc of between approximately 150 to 180 degrees, may be readily operated by any or all of the fingers of one hand of the user and may be pulled backward by cupping the hand in a grasping action. This eliminates the physically-difficult downward, single-finger, pressing action required of conventional pointing devices. Preferably, the mouse has a mass of approximately 150–250 grams, which, for the preferred small-volume mouse, amounts to a high-density mouse that tends to reduce or eliminate rapid or erratic movements that may be inadvertently initiated by the young or less-then-dexterous user.

29 Claims, 3 Drawing Sheets

U.S. PATENT DOCUMENTS

| | | | |
|---|---|---|---|
| 4,862,165 A | 8/1989 | Gart | |
| D315,552 S | 3/1991 | Sacherman | |
| 5,045,842 A | 9/1991 | Galvin | |
| D330,230 S | 10/1992 | Carter | |
| 5,157,381 A | 10/1992 | Cheng | |
| D335,656 S | 5/1993 | Garthwaite | |
| 5,252,970 A | 10/1993 | Baronowsky | |
| 5,287,090 A | 2/1994 | Grant | |
| D347,628 S | 6/1994 | Ashmun | |
| D349,491 S | 8/1994 | Copper et al. | |
| D350,344 S | 9/1994 | Nakada | |
| D350,737 S | 9/1994 | Chen | |
| 5,355,147 A | 10/1994 | Lear | |
| D354,746 S | 1/1995 | Colani et al. | |
| D361,991 S | 9/1995 | Grant | |
| D369,154 S | 4/1996 | Powell | |
| D373,999 S | 9/1996 | Staats | |
| D374,867 S | 10/1996 | Canavan | |
| 5,570,112 A | 10/1996 | Robinson | 345/163 |
| 5,576,733 A | 11/1996 | Lo | 345/163 |
| 5,581,277 A | 12/1996 | Thjiri | 345/164 |
| D377,485 S | 1/1997 | Kaneko et al. | |
| D377,486 S | 1/1997 | Shih et al. | |
| D377,487 S | 1/1997 | Shih et al. | |
| D378,516 S | 3/1997 | Smith et al. | |
| D381,969 S | 8/1997 | Ratzlaff | |
| D383,453 S | 9/1997 | Scenna et al. | |
| D387,749 S | 12/1997 | Diaz | |
| 5,692,956 A | 12/1997 | Rifkin | 463/37 |
| 5,726,683 A | 3/1998 | Goldstein | 340/709 |
| 5,801,692 A * | 9/1998 | Muzio et al. | 345/339 |
| 5,880,715 A | 3/1999 | Garrett | 345/163 |
| 5,894,302 A | 4/1999 | Scenna et al. | 345/163 |
| 5,923,318 A | 7/1999 | Zhai et al. | 345/157 |
| 5,990,871 A | 11/1999 | Adams et al. | 345/167 |
| 6,005,552 A | 12/1999 | Stanley et al. | 345/163 |
| 6,124,846 A | 9/2000 | Goldstein et al. | 345/163 |
| D437,598 S | 2/2001 | Han et al. | |
| D437,852 S | 2/2001 | Ledbetter | |
| D439,907 S | 4/2001 | Edwards | |
| D442,595 S | 5/2001 | Lee | |
| 6,323,843 B2 | 11/2001 | Giles | 345/163 |
| 6,396,474 B1 * | 5/2002 | Johnson et al. | 345/856 |
| 6,469,692 B2 * | 10/2002 | Rosenberg | 345/161 |

* cited by examiner

ERGONOMIC COMPUTER MOUSE

This application claims priority from U.S. patent application Ser. No. 60/276,309, filed on Mar. 15, 2001, entitled "Single Button Computer Mouse for Children", the disclosure of which is incorporated herein by this reference.

BACKGROUND OF THE INVENTION

1. Field of the Invention

This invention relates generally to computer mouses, i.e. pointing devices, and more particularly to computer mouses ergonomically designed for children of ages about 18 months to 5 years, developmentally delayed individuals, ill and/or elderly individuals, of similar physical capability. More specifically, the invention relates to a compact, stable, and easy-to-operate mouse that has a single button or a plurality of buttons placed on the front wall of the mouse.

2. Related Art

Perhaps hundreds of computer pointing devices, called "mouses," have been disclosed since the relatively recent advent of personal computers. Most pointing devices include a rotatable ball and one or more buttons which, when depressed, activate switches. Electronic sensors and encoders sense ball rotation and generate a signal indicative of the ball's rotation.

This signal is then translated to motion of the cursor in an X-Y coordinate system on the computer screen. Depressing the buttons sends commands to the computer to initiate defined program functions.

Generally two basic types of rotating ball systems are used. The most common is confined in the lower portion of the mouse where the ball rests on a flat surface, e.g. a desk top. Movement of the mouse around the flat surface causes rotation of the ball. The other approach, a "trackball", presents the ball directly to the user's thumb or fingers for rotation. In the trackball approach, the mouse does not have to be moved, only the ball rotated within the mouse housing.

Many of these pointing devices claim ergonomic benefits to the user to provide greater precision in movement of the computer screen pointing cursor and to relieve muscle strain in the user. These strain relieving designs address nearly all aspects of the human anatomy from the lower back, the neck, the shoulder, the arms, wrists, hands and fingers.

Children, or developmentally or physically challenged adults, using pointing devices that are of conventional size and ergonomic configuration for adults will experience difficulty in satisfactorily controlling the mouse to the level of precision desired by the young, ill, or elderly individual, and required by the program. Additionally, the buttons of conventional adult pointing devices are often difficult for such individuals to depress, and specifically to exercise the common "drag and drop" program operation.

Prior inventors of pointing devices have largely failed to incorporate an understanding of physiology and development of a child's hand. Hand development in children is much more complex than just the strengthening of hand muscles. It involves the processing of information from the parietal lobe of the brain as it processes somatosensory information, the generation of motor programs to collect this data, and the generation of motor acts. In addition, visual spatial skills are necessary to guide the placement of the hand.

The central nervous system control of the hand is different from that of the shoulder, trunk or other proximal movements. The child must first develop trunk, neck, and shoulder stability before the hand can perform its intended functions. Individual finger motion depends on the pyramidal tracts and the primary motor cortex. The synapses of the corticospinal fibers improve the speed and dexterity of the finger movements. Without sensory input, vision can provide some information but the refined grasp, pinch, and manipulation of objects require sensory feedback.

Movements also have to be planned and sequenced which requires the premotor and supplemental motor areas of the brain. Vision is again a part of this process for smooth coordinated movements. One of these areas of the brain also commits the action to memory.

The anatomic and kinesiologic relationships of the hand and arm provide a structural foundation for the functional adaptability of the hand. The twenty-seven bones of the hand are arranged in three arches, two transverse and one longitudinal. The intrinsic muscles of the hand are responsible for the changes in the configuration of the arches. They originate and insert within the hand. The grasp by the hands and fingers depends on the integrity of the mobile longitudinal arch. The joints allow for the unique movements of the thumb and fingers. The extrinsic muscles originate on the forearm. These muscles provide the child with movement of the forearm, wrist, and fingers.

Functional hand movements are related to the sensory, perceptual, and cognitive abilities of a child. While control of the force of grasp is only one parameter of manipulation it does equate to the development of skills. A one-year-old child is not able to hold a paper cup without crushing it, while a three-year-old can. The force of grasp continues to be refined as a four-year-old child can adjust movements and handle fragile objects or stack blocks. Discrete movements, such as writing, require efficient control of finger movements and can take years to control. For some children writing mastery is not achieved until their twelfth birthday. This coincides with the myelinization of certain parts of the corpus collosum of the brain. As these tracts mature, the child's velocity to respond improves.

The conventional computer mouse requires isolated and independent movements of the fingers and thumb, and stability of the wrist, forearm and shoulder. In addition, vision, somatosensory perception of the arm and hand in space, and the cognitive awareness of the function of the mouse are necessary for its proper and effective use. While a toddler can isolate finger movements, he or she is not able to coordinate these movements purposefully with a typical mouse. Coordinated release of an object, such as a mouse or mouse button, occurs between the ages of three and four years.

A standard computer mouse requires the very controlled pressurization and release by one finger for operation of a mouse button. Object size will affect the manipulative abilities of a small child. The larger the object in comparison to the size of the hand results in a decrease in the child's ability to perform. Rotating a small object in the fingers begins at about four-years of age. A child of four is able to switch from using an external surface for manipulation to being able to complete the task totally within the hand. The grip force rate is related to tactile mechanisms and the reflex is not present until four-years of age. This relates to the child's ability to hold onto an object with the correct amount of force while manipulating it.

As will be seen from the following discussion of a few important examples from the myriad prior art, the aforementioned considerations for the design of mouse pointing devices are notable by their absence. For example, Robinson (U.S. Pat. No. 5,570,112) discloses a computer mouse having a soft rubber structure built into the housing for comfortably supporting the wrist and palm of the adult computer operator. This inventor provides mouse buttons at the front of the mouse, generally at an angle of approximately 45 degrees from the vertical. This approach partially enables a child to grasp the buttons, a better configuration than having the child press downward on buttons situation on the top of a mouse. Robinson's design also provides a plurality of buttons, the selection and separate actuation of which is difficult for children from about 18 months to about 5 years of age.

Lo (U.S. Pat. No. 5,576,733) teaches an ergonomic computer mouse that includes an upright, primary finger-supporting surface for supporting all of the fingers of an upright hand in straight positions and in an upright stack. Lo also includes an opposite thumb-supporting surface. Lo asserts that the operator's hand, while holding this mouse, will be in a naturally upright and relaxed position, without requiring twisting of the hand, wrist, or forearm. As a result he claims that fatigue, discomfort, and pain are minimized or eliminated even after a long period of continuous use. Clearly Lo has given careful thought to the ergonomics of computer pointing devices and has made an important advancement in that direction. However, Lo does not address the very different and specialized needs of the child that is 18 months–5 years old.

Goldstein et al. (U.S. Pat. No. 5,726,683) discloses an ergonomically designed mouse having a top surface that has a negative slope of 15 to 30 degrees from front to rear. This mouse also has a vertically rising left side surface and a plurality of buttons curving from the front of the top surface and rotated in a counterclockwise position when viewed from the front of the mouse. Although Goldstein's buttons curve around the front surface of his mouse, they fail to meet the aforementioned specialized finger grasping needs of the child computer operator. In addition, the plurality of buttons is in excess of a child's ability to manipulate effectively.

Barr (U.S. Pat. No. 5,894,303) has invented a hand holdable computer mouse that has an external contour or shape that conforms to the smoothed-out mean of the contour of the palm or inside surface of the adult hand when it is in a neutral state. The mass of the ergonomic computer mouse is vertically oriented so that the hand, wrist and forearm of the person holding and operating the mouse are maintained in a neutral disposition, without radial nor ulnar deviation, with the palm of the hand vertically disposed and the hand essentially resting on the ulnar portion thereof. Excursions of this mouse across the work surface are effected by wrist flexion and extension without radial nor ulnar deviation and without forearm pronation nor supination but with neutrally oriented forearm and shoulder muscles. As others have done, Barr has carefully considered the adult anatomical considerations in the design of her mouse. However, as others have also failed to do, Barr does not orient the design of her mouse to the special needs of children.

Finally, and perhaps most relevant to the extant invention, Adams et al (U.S. Pat. No. 5,990,871) describes a pointing device designed for children aged 2–6. Adams' overall objective is to provide a mouse that accommodates the hand size, motor control and postural needs of young children. Adams' overall approach is to provide a specially designed two-handed track ball having a single button. Specifically, a relatively large ball is provided that extends above a housing. The housing has left and right gripping areas or handles for both hands of the user. A button, occupying a 40–60 degree horizontal arc, is provided at the front of the housing. The placement, shape and size of the button is intended to optimize activation of the button by the child user. In operation the child first orients the housing by gripping it with both hands and orienting the mouse so that the mouse button faces the user. The child then places one hand on the ball and rotates the ball until the cursor is at the desired location on the computer monitor screen. The user then "strikes" the button with a thumb or index finger to perform the desired program function.

Clearly Adams and has made an important advance with respect to providing a track ball type of mouse that is convenient and practical for use by young children. Nevertheless, significant opportunities remain for improvements beyond conventional pointing devices by taking into consideration the unique anatomic and kinesiologic relationships of a child's hand and arm along with his/her sensory, perceptual, and cognitive abilities, and/or for the unique needs of a developmentally delayed, ill, or elderly individual. The present invention addresses these needs.

SUMMARY OF THE INVENTION

This invention is a pointing device, i.e. a computer mouse, for producing computer program commands issued by young children, or by others with similar physical or mental development. This device includes a housing having a plurality of surfaces, including a top surface, a bottom surface and a front surface. A pointing mechanism is provided in or on the mouse that is adapted for moving a cursor on a computer monitor screen. A rotatable ball, a track ball, an optical pointer such as Intellimouse™ system, a joy stick, or other mechanisms may be used. For example, a rotatable ball may be conventionally provided in the housing, so that a portion of the ball extends downward from the housing's bottom surface to rest on, and frictionally engage, a flat surface such as a table top.

Preferably one horizontally-elongated control button is located within the front surface of the housing. By "control" button is meant that the button may be adapted to operate as a "left click" and/or "right click" button or other switching for signaling commands to the computer. This button, comprising a horizontal arc member extending approximately 150 to 180 degrees, may be readily grasped by any one, a plurality, or all of the fingers of one hand of the child operator. The preferred single button, or alternative plurality of buttons on the front surface of the mouse housing, allow a rearward "grasping" motion to actuate the button(s) rather than a downward pressing motion. This grasping motion, which may be likened to a clenching of the hand on the mouse, eliminates the downward, single finger, pressing action required of conventional pointing devices, which action is physically difficult for a child or other individual of similar capabilities.

Preferably, the mouse has a mass of approximately 150–250 grams without the mouse cord, and is a compact shape that fits well within a child's palm. The resulting high density, or high weight per volume, reduces or eliminates rapid or erratic movements of the mouse that may be initiated by the child or developmentally delayed person.

In the preferred embodiment, the novel button further includes a lower shelf upon which the distal ends of the operator's fingers may rest. The button may further include an upper ridge which assists in orienting the child operator's fingers with respect to their proper position on the mouse for activation of the button. The front surface of the button may be textured to provide tactile feedback and therefore enhance the child operator's control of the button.

In an alternative embodiment, the mouse housing incorporates a means for button activation feedback to the child or other operator. This feedback confirms that the button is effectively depressed. This feedback may be provided, for example, by either illumination of the button, by vibrating a portion of the housing, or by an audio means produced by the mouse, or produced by the computer upon sensing activation of the mouse button. In some applications it may be desirable to incorporate combinations of a plurality of these feedback methods into the mouse.

Primary objects of this invention include:
  a. To provide a novel yet practical computer pointing device, or mouse, that is uniquely adapted for use by children aged about 18 months–5 years, and that may also be comfortable and effective for developmentally delayed of physically challenged individuals.

b. To incorporate into the design of this mouse the special anatomic and kinesiologic relationships of a child's hand and arm and the child's sensory, perceptual, and cognitive abilities.

c. To provide a child's mouse with unambiguous button operation by incorporating preferably a single mouse button, or alternatively a plurality of buttons, that is/are operated by a grasping action of any or all of the child's fingers.

d. To provide a mouse that supports the arches of the child's developing hand.

e. To provide a mouse that allows the child to isolate his/her finger movements and control the release of the button while the wrist is fully supported.

f. To provide audio, tactile, and/or visual feedback to the child or other user confirming successful button activation.

g. To provide an especially stable mouse by damping rapid or erratic movement, preferably by providing a broad-based mouse of high density for a stable, "weighted" effect.

h. To provide a mouse that meets the needs of developmentally delayed persons having a physical capability equivalent to that of a young child.

These and many other features and attendant advantages of the invention will become apparent as the invention becomes better understood by reference to the following detailed descriptions and accompanying drawings.

DETAILED DESCRIPTION OF THE INVENTION

Referring to the Figures, there are shown several, but not the only, embodiments of the invented ergonomic "mouse" computer pointing device. FIGS. 1–5 depict the preferred single button computer mouse for children according to the invention. This pointing device 1 includes housing 10 having top surface 11, bottom surface 12, left side surface 13, right side surface 14, front surface 15 and back surface 16. Rotatable ball 20 is provided in housing 10 and a portion of the ball extends downward from the bottom surface the housing.

By saying that a pointing mechanism (such as a rotatable ball) is "in the housing," it is understood that the pointing mechanism may be inside or only partially inside the housing. Typically, the pointing mechanism will be mounting inside the housing and extend out from the bottom surface or another surface for interaction with a mouse pad, desk surface, user's hand, or other surface. The pointing means are operatively connected by cord, optical, or other means, for example, to a computer so that movement of the pointing means relative to the mouse (by rolling on a pad or by being moved by the user) for moving a cursor on a monitor screen.

The front surface 15 is substantially vertical when the mouse 10 is placed on a desk or table for use. Button 30 is located within front surface 15 of the housing, and is operably and electrically/electronically connected to the internal chip/workings of the mouse to actuate the function of the button, for example, a conventional "left click" function or other command switching. The button 30 extends substantially vertically around all or substantially all of the front end of the mouse. Most preferably, a substantial amount of the button 30 front surface is vertical, and most preferably within +/–15 degrees of exactly vertical. Button 30 is preferably an elongated member that extends horizontally along a horizontal arc of between approximately 150 to 180 degrees. This button 30 has a radius of about 0.62 to 1.25 inches, and, as may be seen to best advantage in FIG. 2–4, preferably extends rearward along both the left side surface 13 and right side surface 14 about ⅓ of the distance from the front extremity 115 of the mouse 10 to the rearward extremity 116 of the mouse.

In the preferred embodiment, button 30 includes lower shelf 32, which protrudes forward preferably substantially all the way along the longitudinal dimension of the button 30. The distal ends of the child operator's fingers may actually rest on the top surface of the ridge, and this also increases the child's ability to precisely control the button. Preferably, also, the button 30 has a generally concave outer or "front surface" 31 that generally faces forward and presents a gradually curved surface that comfortably provides, in effect, a recessed elongated area for all of the user's fingers at their distal ends. Preferably, upper ridge 34 runs along substantially the entire length of the button at or near the top edge of the button. This upper ridge 34 does not protrude from the surrounding button front surface 31 as far as does the lower shelf 32, and the ridge 34 may be called slightly-protruding ridge or line along the button that protrudes forward only about 1/10 as far or less than the shelf 32. This upper ridge 34 is provided to assist the child in properly orienting his/her fingers on the mouse and over the button. Perhaps on a more pronounced scale, this ridge locates the child's fingers much like the smaller protuberances on the "f" and "j" home keys of a conventional QUERTY keyboard. The combination of the lower shelf 32, the preferred curved outer (front) surface 31 of the button, and the preferred upper ridge 34 results in sure and comfortable placement of the fingertips, wherein the user does not have to search for the proper position and is unlikely to loose proper placement of the fingers on the mouse during use.

Figure 1:
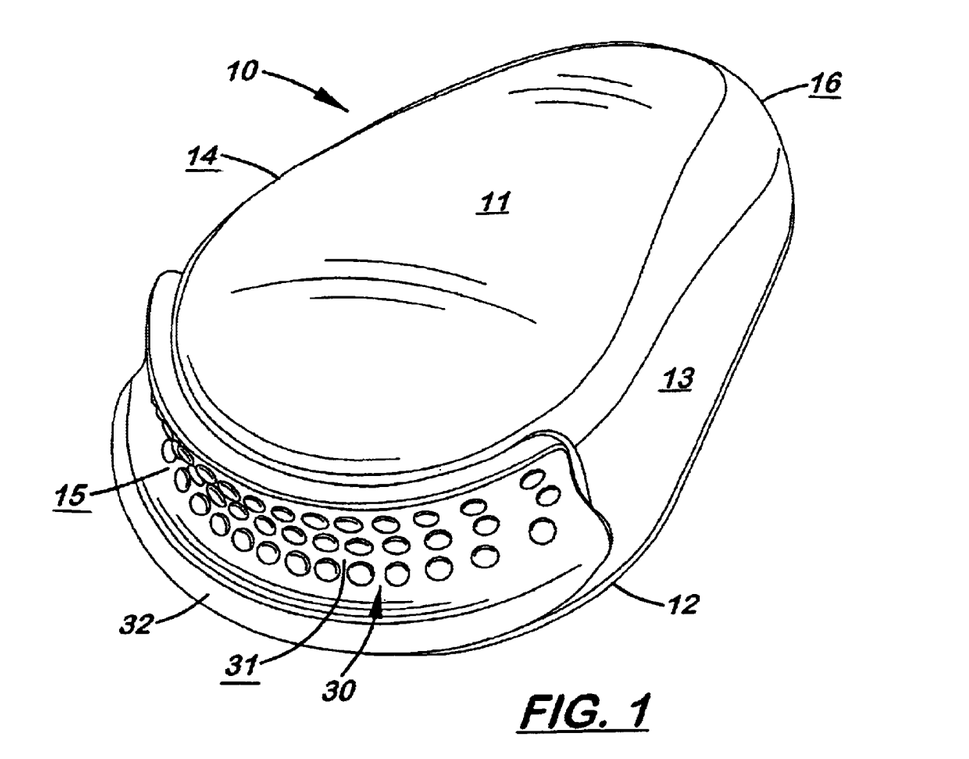
FIG. 1 is an upper front perspective view of the pointing device of this invention.
Figure 2:
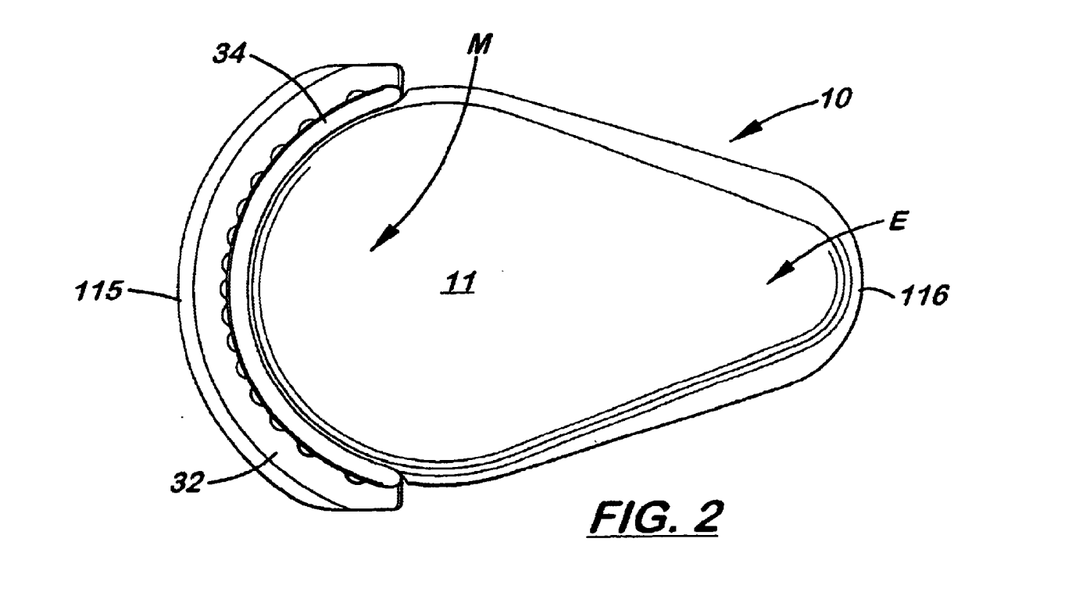
FIG. 2 is a top view of the embodiment in FIG. 1.
Figure 4:
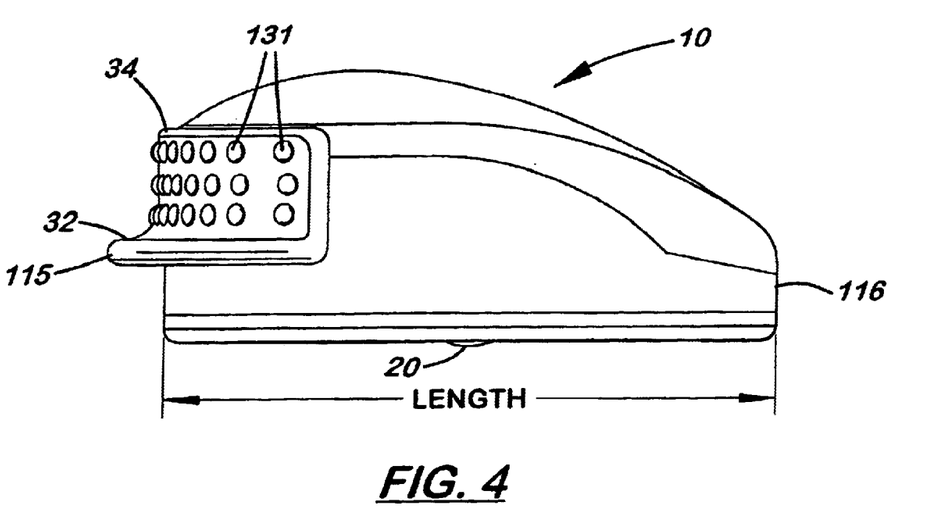
FIG. 4 is a left side view of the embodiment of FIGS. 1–3.

Also in the preferred embodiment, the button also includes texturing on front surface 31 of the button. Texture may be provided to the front surface of the button by incorporating ridges, elevated dots 131, roughened surfaces, or the like. The texturing may be different or differently-spaced near the center, front of the button, for example, from the texturing near the right and left ends of the button, in order to further orient the fingers to the desired area. In FIGS. 2 and 4, one may see that the far-left and far-right rows of raised dots are more widely spaced from the next rows of dots than are the central rows of dots. This way, even a child may become accustomed to a particular "feel" that results when the fingers are centered on the button, and may feel particularly confident and comfortable in grasping and using the mouse. In addition, the button may be made of a soft rubbery or otherwise slightly cushioned to provide a comfortable and non-slippery texture.

The buttons of conventional pointing devices require isolated and independent movements of the fingers and thumb plus stability of the wrist, forearm and shoulder.

Additionally, vision, somatosensory perception of the arm and hand in space, and the cognitive awareness of the function of the mouse are necessary for effective use of the mouse. While a young child can isolate finger movements, he or she is not able to coordinate these movements purposefully for use with a conventional mouse. As a consequence, the child may inadvertently cause an erroneous right click of a traditional two-button mouse. And even without erroneous clicking, the child or other user is often uncomfortable and un-confident about his/her finger placement on a mouse when first touching the mouse and during use of the mouse.

The design of the button of this invention takes into account these limitations of a young child and provides a novel and effective solution that is an important feature of this invention. The design of this mouse allows the child to grasp the single, wide button 30 with his or her fingers, and preferably with a plurality of his/her fingers, rather than pressing downward with a single digit as is required by conventional pointing devices. This grasping action is generally a rearward motion of the user's finger's inward generally toward the user's palm, and this action provides the desired degree of control over button operations substantially or entirely without uncomfortable and unnatural actions. The design of button 30 allows, and indeed encourages, a grasping motion by any one, a plurality, or all of the child's or other user's fingers. For a child, this grasping action, whether it is with one or more fingers, substantially improves the child's ability to initiate, terminate and precisely control button operations. The preferred single, wide-button approach allows an individual missing one or more fingers to easily operate the mouse, wherein rearward action rather than downward action on the button actuates the button's switching function.

As depicted to best advantage in FIGS. 1–4, the placement of button 30 is at the front of the housing. This novel placement of the button contrasts with the normal placement of the button of conventional pointing devices on the top surface of the mouse, which top position is clearly inappropriate for young children. In the preferred embodiments of the invention, the button faces away from the operator, and does not extend to or across the top surface of the mouse to any significant extent.

In FIG. 4, one may see that the top edge of the button is located at what may be called an upper, front, generally rounded corner of the mouse. The ridge 32 at or near the lower edge of the button extends out generally horizontally at about ⅓ to ½ of the way from the bottom surface of the mouse to the topmost extremity of the mouse. Also, importantly, this button wraps around the front surface of the housing from approximately 150 to 180 degrees. This comparatively wide, curving button permits the child to grasp the button with any or all of his/her fingers, rather than having to "point" one finger at a surface for pressing of a conventional mouse button.

In preferred embodiments, there are no buttons or other user-operated control/command mechanisms on or above the top surface of the mouse, and no buttons or other user-operated mechanisms on the rearward half of the left and right sides of the mouse or on the rear side of the mouse. Alternative embodiments of the invention may include a roller ball behind the click button(s) 30 preferably on the left side of the mouse, or a joy stick or roller ball on the left side or top of the mouse, both for thumb and/or finger operation.

The mouse shape may be described as a generally pear-shaped mouse body (looking downward on the mouse) with a generally circular or cylindrical front main portion "M," that has a curved front surface, and a rearward-extending area "E" that extends slightly rearward toward and underneath the user's wrist and terminates at its rearmost extremity 116. The preferred top surface is mounded/domed and slopes downward toward the rear end. The front, broad side faces forward for attachment to a cord to the computer, or for adaptation for other communication with the computer. The preferred embodiment has only one or two click buttons extending horizontally across the broad side of the mouse, as discussed above. In use, the user may rest his/her palm generally horizontally across the top surface of the mouse, "draping" his/her finger(s) over the top front corner of the mouse and down generally vertically along the front surface of the button(s).

Figure 3:
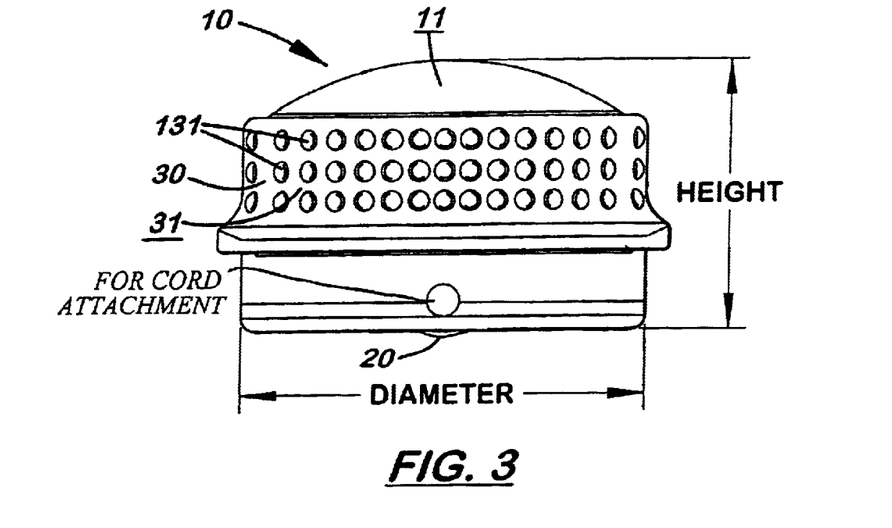
FIG. 3 is a front side view of the embodiment of FIGS. 1 and 2.

An especially preferred feature of this invention is its relatively large mass for its relatively low volume, that is to say, relatively high density. This high density tends to minimize and even eliminate most of the undesirable rapid and erratic movements that are characteristic of, for example: the developing child, a developmentally delayed person, an adult who is using a laptop computer in small quarters (such as a bus or car) and is using an optical input type device, or an elderly person with reduced mobility in his/her grasping or depression motion of the fingers due to arthritis or other disease processes. The preferred embodiment, which is particularly beneficial for children or small individuals, has a mass of approximately 150–250 grams, and a size within the following preferred ranges:

diameter of 1.25 inches to 2.5 inches, wherein the diameter is the diameter of the main portion M, as shown in FIG. 3; height of 1 inch to 1.5 inch as shown in FIG. 3; and length of 1.25 to 3.25 inches as shown in FIG. 4.

Alternative embodiments of the invented mouse for larger individuals would have a mass preferably in the range of approximately 150–300 grams (most preferably 150–250 grams) and a size within, and most preferably near the top end of, the following ranges:

diameter of 1.25 inches to 3.25 inches, wherein the diameter is the diameter of the main portion M, as shown in FIG. 3; height of 1 inch to 2.25 inch as shown in FIG. 3; and length of 1.25 to 4 inches as shown in FIG. 4.

As will be noted from the Figures, the overall ergonomic design of the size, shape and weight of the mouse of the preferred embodiments of this invention is optimized for children aged about 18 months to 5 years. However it is also well suited for use by developmentally delayed persons having a capability similar to a 18 mo.-5 year old child, or can also be used by an adult while using a laptop computer, especially while using either the mechanical or optical mouse device described herein. This mouse device would also be appropriate for an elderly individual with arthritic hands (as grasping motion to activate this mouse is easier than depressing a single finger, as in the traditional mouse button arrangement), and with the single button arrangement, is less confusing to a novice computer user (particularly an elderly person) who may be unfamiliar with right clicking and the results of that action.

Figure 5:
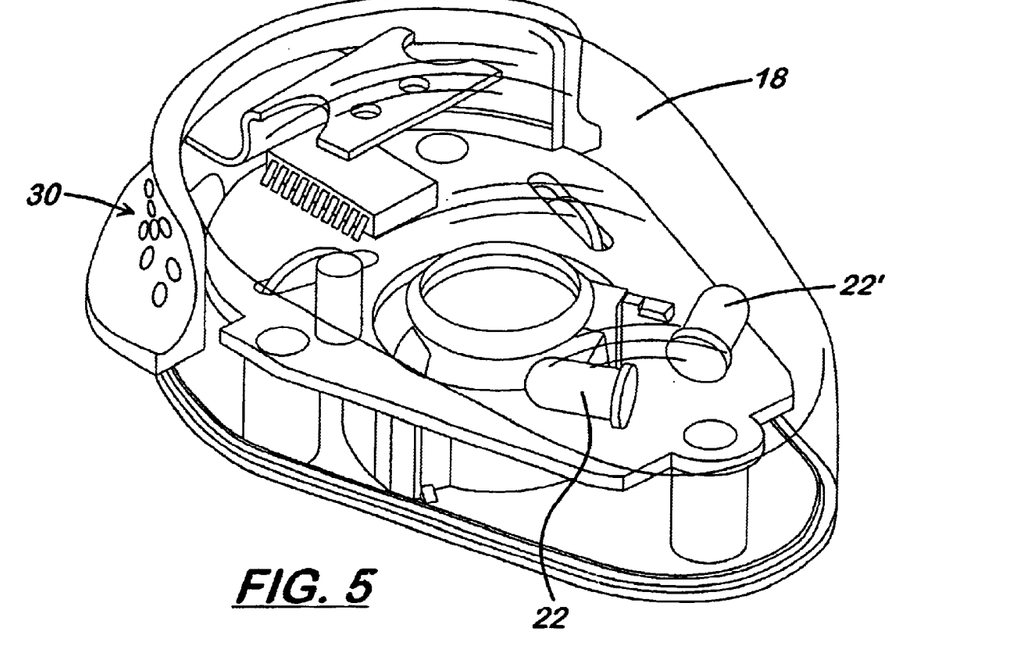
FIG. 5 shows an upper back perspective view of another embodiment of the invention with a translucent top cover, and two colored LED button activation feedback lights.

In an alternative embodiment, the pointing device of this invention further includes means for button activation feedback to confirm activation of the button to the child operator. A variety of feedback means are provided. The first, visual feedback, provides the child operator the additional necessary sensory feedback for more sustained and consistent "drag and drop" performance. This effectively addresses the developmental issue of how vision assists the ability of the child to perform smooth, coordinated movement. FIG. 5 shows the mouse with translucent top cover 18 within housing 10 through which the light from the source, the two red or otherwise-colored LED feedback lights 22, 22', is transmitted. Alternatively, the housing 10 may be formed entirely from a transparent or translucent material such so that the entire housing is illuminated upon activation of the mouse. Further, the translucent or transparent cover or body of the mouse may reveal components of the mouse to the user that inspire the curiosity and interest of the user and provide a interesting mouse appearance.

Another button activation feedback means includes vibration of the housing, or some portion thereof. For example, a vibratory pad (not shown) may be isolated from the housing so that vibrations are not transmitted to the ball to avoid any unintentional motion of the cursor. Alternatively, this vibration may be provided to button 30 or another portion of the housing. A third alternative feedback means may be provided by an audio source (not shown) contained within the housing or by transmission of an audio control signal to the computer. A fourth alternative feedback means may be provided by a video source (not shown) by transmission of a video control signal to the computer. In some applications it may be desirable to incorporate combinations of these feedback methods into the mouse, in which case an appropriate selection switch will be incorporated.

Known electronic circuits and components are incorporated within the mouse of this invention. This includes the sensing of the motion of the ball, the switching device and circuitry associated with the button, the processing of motion and button information, the transmission of the control signals to the computer, and the power source. Also, the rotatable ball 20 may be substituted by an optical mouse location system, as in, for example, the IntelliMouse™ product by Microsoft Corp. Also, other conventional mouse location input mechanisms, or "pointing mechanisms" may be used. That is, the mouse method of operation may be obtained by mechanical input, optical input, RF/IR input, or other means. Known technology is also used to generate the illumination, vibration and audio feedback features. Known materials are used in the construction of housing 10 and button 30, typically durable, non-toxic plastics or rubber. When the illumination feedback feature is incorporated, transparent or translucent "windows" are incorporated into the housing such that they may be readily viewed by the operator. Alternatively, the entire housing may be transparent to reveal not only the light source but also to expose the inner workings of the mouse to the curious mind of the child.

Figure 6:
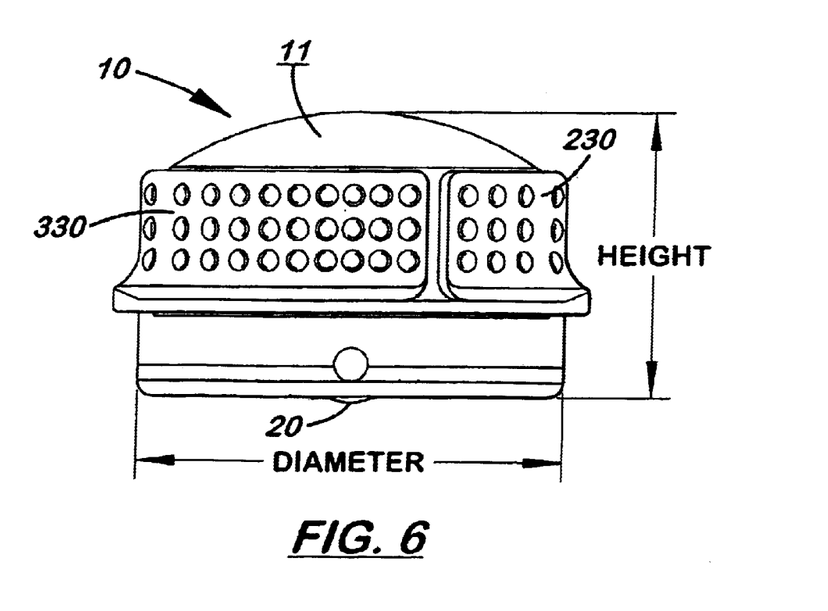
FIG. 6 shows a front view of an alternative embodiment having two front-side, concave buttons for mouse operation.

The inventor also envisions that a plurality of buttons 30 may be used in the invented mouse, wherein the buttons are preferably generally of the type and in the same general location as described in the single-button invention. FIG. 6 illustrates one embodiment of a mouse 10' according to the invention having two buttons, side-by-side on the front surface of the mouse, wherein the left button 230 for "left clicking" extends along a horizontal arc (about 60–70 degrees) smaller than the arc of the right button 330 for "right clicking" (about 90–120 degrees). Alternative arc lengths are envisioned for embodiments with a plurality of buttons, but preferably each button extends at least 40 degrees to give a finger ample room, and, more preferably, extends in the range of about 45–135 degrees.

The same general shape is used for multiple buttons as in the single button embodiment, with a lower shelf protruding generally forward from the front of the button at its lower edge; an upper ridge protruding only slightly from near the upper edge fo the each button; a generally concave outer, front surface to cradle the fingertips of the user; and a textured surface. There may be a vertical ridge(s) or other texture or means of raised marking to allow the user to feel where one button ends and the other button begins. With the preferred features, a user should be more confident and comfortable and capable of operating a two-button mouse than conventional two-button mouses with top buttons.

While the invented mouse is described for a conventional orientation of being set on a pad or desk surface on the right of a user for use in the user's right hand, the invention also includes other orientations, and is not limited to requiring particular elements to be only on the left or only on the right. One may see that, in the especially preferred embodiment, it is generally symmetrical on its longitudinal axis from front surface to back surface and may be used in a user's left hand as well as in the user's right hand.

Although this invention has been described above with reference to particular means, materials and embodiments, it is to be understood that the invention is not limited to these disclosed particulars, but extends instead to all equivalents within the scope of the following claims.

I claim:

1. A computer moose for use with a computer, the computer mouse comprising:
   a housing having a top surface, a bottom surface for placement on a generally horizontal surface, and a front surface, wherein the front surface is substantially vertical;
   a pointing mechanism in the housing and adapted to be operatively connected to a computer; and,
   a horizontally-arched button located within the substantially vertical front surface of the housing and adapted to be operatively connected to a computer, wherein the button has a lower edge and a generally horizontal lower shelf extending from the button near the lower edge for supporting the distal ends of the operator's fingers.

2. A computer mouseas in claim 1, wherein the housing further has a left side and a right side, and the button arches from near the left side around the front surface to the near right side in an arch of approximately 150 to 180 degrees.

3. The mouse of claim 1 which also comprises a feedback means which confirms that the button is depressed.

4. A computer mouse as in claim 3 wherein the feedback means comprises a light on or in the mouse.

5. The mouse of claim 3 wherein the feedback means comprises a vibrator on or in the mouse.

6. The mouse of claim 3 wherein the feedback means comprises an audio signal produced by the mouse or the computer.

7. The mouse of claim 3 wherein the feedback means comprises a video signal produced by the computer.

8. The mouse of claim 1 wherein said pointing mechanism is a rotatable ball in the bottom surface of the mouse.

9. The mouse of claim 1 wherein said pointing mechanism comprises a track ball.

10. The mouse of claim 1 said pointing mechanism comprises a joy stick.

11. The rouse of claim 1 which has a back surface opposite said front surface, and which has an outside diameter in the range of 1 1/4 inches to 2 1/2 inches, a height from bottom surface to top surface in the range of 1 inch to 1 1/2 inches and a length from front surface to back surface in 4 range of 1 1/4 inches to 3 1/4 inches.

12. A computer mouse as in claim 11, having a mass of approximately 150 to 250 grams, excluding any cord connecting the mouse to the computer.

13. The mouse of claim 1 which has a back surface opposite said front surface, and which has an outside diameter in the range of 1 1/4 inches to 3.25 inches, a height from bottom surface to top surface in the range of 1 inch to 2.25 inches and a length from front surface to back surface in the range of 1 1/4 inches to 4 inches.

14. A computer mouse as in claim 13, having a mass of approximately 150 to 250 grams, excluding any cord connecting the mouse to the computer.

15. A computer mouse for use with a computer, the computer mouse comprising:
   a housing having a top surface a bottom surface for placement on a generally horizontal surface, and a front surface, wherein the front surface is substantially vertical;

a pointing mechanism in the housing and adapted to be operatively connected to a computer; and, a horizontally-arched button located within the substantially vertical front surface of the housing and adapted to be operatively connected to a computer; wherein the button has an upper edge and has an upper ridge near the upper edge for assisting in orienting the operator's fingers.

16. A computer mouse for use with a computer, the computer mouse compdsing:

a housing having a top surface, a bottom surface for placement on a generally horizontal surface, and a front surface, wherein the front surface is substantially vertical;

a pointing mechanism in the housing and adapted to be operatively connected to a computer; and, a horizontally-arched button located within the substantially vertical front surface of the housing and adapted to be operatively connected to a computer, wherein the button has a front surface that is textured for providing feedback to the operator's fingers.

17. A computer mouse for use with a computer, the computer mouse comprising:

a housing having a top surface, a bottom surface for placement on a generally horizontal surface, a front surface, a back surface opposite the front surface, a left side surface and a right side surface, wherein the front surface is substantially vertical;

a pointing mechanism in the housing and adapted to be operatively connected to a computer for moving a cursor on a computer monitor screen; and, a single horizontally-arched control button located within the substantially vertical front surface of the housing and adapted to be operatively connected to a computer, wherein said front surface curves horizontally from the left side surface to the right side surface, the single control button arches around the front surface in the range of 150 to 180 degrees, and the single control button does not extend over the top surface;

and wherein said computer mouse comprises no controls on said top surface.

18. The mouse of claim 4 wherein the control button has a lower edge and a generally horizontal lower shelf extending from the button near the lower edge for supporting the distal ends of the operator's fingers.

19. The mouse of claim 17 wherein the control button has an upper edge and has an upper ndge near the upper edge for assisting in orienting the operator's fingers.

20. The mouse of claim 17 wherein the control button has a front surface that is textured for providing feedback to the operator's fingers.

21. The mouse of claim 17, which also comprises a feedback means which confirms that the button is depressed, wherein said the feedack means is selected from the group consisting of: a light or in the mouse, a vibrator on or in the mouse, an audio signal produced by the mouse or the computer, and a video signal produced by the computer.

22. The mouse of claim 17 wherein said pointing mechanism is selected from a group consisting of: a rotatable ball in the bottom surface of the mouse, a track ball, and a joy stick.

23. The mouse of claim 17 which has an outside diameter in the range of 1 1/4 inches to 2 1/2 inches, a height from bottom surface to top surface in the range of 1 inch to 1 1/2 inches and a length from front surface to back surface in the range of 1 1/4 inches to 3 1/4 inches.

24. The mouse of claim 17 which has a back surface opposite said front surface, and which has an outside diameter in the range of 1 1/4 inches to 3.25 inches, a height from bottom surface to top surface in the range of 1 inch to 2.25 inches and a length from front surface to back surface in the range of 1 1/4 inches to 4 inches.

25. The mouse of claim 23 has a mass of approximately 150 to 250 grams, excluding any cord connecting the mouse to the conmputer.

26. The mouse of claim 24 which has a mass of approximately 150 to 250 grams, excluding any cord connecting the mouse to the computer.

27. A computer mouse for use with a computer, the computer mouse comprising:

a housing having a top surface, a bottom surface for placement on a generally horizontal surface, and a front surface, wherein the front surface is substantially vertical;

a pointing mechanism in the housing and adapted to be operatively connected to a computer; and, first and second horizontally-arched buttons located within the substantially vertical front surface of the housing and adapted to be operatively connected to a computer, wherein said first button arches horizontally in the range of 90 to 120 degrees wherein said first and second horizontally-arched buttons do not extend over the to surface; and wherein said computer mouse comorises no controls on said top surface.

28. The mouse of claim 27 wherein the housing futher has a left and a right side, and wherein said first button arches in said range of 90 - 1.20 degrees from the right side around the front surface for use as a right-click button.

29. The mouse of claim 28 wherein said second button arches from near the left side toward the right side in the range of 60 - 70 degrees for use as a left-click button.

* * * * *